United States Patent [19]
Kochem et al.

[11] Patent Number: 5,495,232
[45] Date of Patent: Feb. 27, 1996

[54] WIRING CONCENTRATOR FOR DATA NETWORKS

[75] Inventors: Robert C. Kochem, Belmont, Mass.; Peter Hayden, Mont Vernon, N.H.

[73] Assignee: Digital Equipment Corporation, Maynard, Mass.

[21] Appl. No.: 237,462

[22] Filed: May 3, 1994

Related U.S. Application Data

[63] Continuation of Ser. No. 896,127, Jun. 9, 1992, Pat. No. 5,355,124.

[51] Int. Cl.[6] .............................. H04J 14/00; H04J 3/02
[52] U.S. Cl. ..................... 340/825.05; 370/56; 370/16.1; 370/85.15
[58] Field of Search .......................... 340/825.01, 825.05; 370/15, 16, 16.1, 85.12, 85.14, 85.15, 56; 375/107

[56] References Cited

U.S. PATENT DOCUMENTS

| | | | |
|---|---|---|---|
| 4,837,856 | 6/1989 | Glista, Jr. ................................. | 455/601 |
| 4,858,232 | 8/1989 | Diaz et al. ................................. | 370/86 |
| 4,951,280 | 8/1990 | McCool et al. ....................... | 370/85.12 |
| 5,023,872 | 6/1991 | Annamalai ................................. | 371/5.1 |
| 5,043,981 | 8/1991 | Firoozmand et al. .................. | 370/85.1 |
| 5,058,132 | 10/1991 | Li .............................................. | 375/38 |
| 5,155,726 | 10/1992 | Spinney et al. ..................... | 340/825.03 |
| 5,182,747 | 1/1993 | Frenzel, III et al. .................. | 370/85.5 |
| 5,210,741 | 5/1993 | Grochmal .................................... | 370/56 |
| 5,355,124 | 10/1994 | Kochem et al. ..................... | 340/825.05 |

*Primary Examiner*—Michael Horabik
*Attorney, Agent, or Firm*—Kenneth F. Kozik

[57] ABSTRACT

A wiring concentrator (160) for Fiber Distributed Data Interface (FDDI) networks employs only two PHY modules (182 and 184) for initialization of all attached stations (174, 176, 178, and 180). A bank of switches (204, 206, 208, and 210) initially switches one of the stations into full-duplex communication with one of the PHY modules (182), with which it performs the initialization process. The attached station (174, 176, 178, or 180) is then switched into a loop formed with the other PHY (184), in which loop the station remains in the active state that it reached as a result of the initialization process. The process is then repeated for each attached station. A separate PHY module thus is not required for every attached station.

12 Claims, 6 Drawing Sheets

WIRING CONCENTRATOR FOR DATA NETWORKS

This is a continuation of application Ser. No. 07/896,127 filed on Jun. 9, 1992, now U.S. Pat. No. 5,355,124.

BACKGROUND OF THE INVENTION

The present invention is directed to data networks and in particular to wiring concentrators employed in them.

FIG. 1 depicts a local-area network 10 of a type that can implement the Fiber Distributed Data Interface ("FDDI") standard developed by Committee X3T9.5 of the American National Standards Institute ("ANSI"). The network comprises a plurality of network stations 12, 14, 16, and 18 connected by fiber-optic cables. (Actually, networks that implement all aspects of the FDDI specification except for those dealing with the lowest, physical-medium-dependent sublayer have been implemented without fiber-optic cables or optical signals, and those skilled in the art will recognize that such networks can be considered FDDI networks for the purposes of the present invention. To make the description concrete, however, we will refer to the signal medium as optic fibers.)

In accordance with one topology that the standard specifies, two rings interconnect the stations. A primary ring includes fiber-optic cables 20, 22, 24, and 26, and a secondary ring comprises fiber-optic cables 28, 30, 32, and 34. The signals propagating over the rings convey data organized into "packets," which include information concerning, among other things, the source of the packet and its intended destination. In ordinary operation, a station such as station 12 receives packets from the primary ring by means of a primary input port 36, and a primary output port 38 forwards each packet thus received unless station 12 was itself the source of the packet, in which case station 12 "removes" the packet by not forwarding it. If the packet lists station 12 as its destination, on the other hand, that station still forwards the packet, but it also copies it for use by whatever higher-level entity that station includes.

Also passed along the ring is a special message called a "token," whose receipt enables a station to originate packets rather than just forwarding them. If a station needs to originate a packet, it responds to receipt of the token by removing it rather than forwarding it. It thereby prevents other stations from originating packets until it has finished sending its own packet and returned the token to the ring.

Ordinarily, therefore, the packets follow a primary-ring path that includes dashed lines 40. But this type of operation requires that all stations between the source and recipient—and, indeed, all other stations, too—properly forward the data packets, so if a ring of this type has a large number of stations, it tends to be unreliable in the absence of the secondary ring. While the primary ring carries packets in one direction—i.e., counterclockwise in FIG. 1—the secondary ring carries them in the opposite direction. If station 12 detects no faults in its communications with its immediate neighbors, it merely forwards all secondary-ring packets by means of secondary input and output ports 42 and 44. And if all stations and links are operating properly, the secondary ring carries only so-called "line state" messages rather than packets of the data whose transmission is the network's ultimate purpose. As a result of the secondary ring's reverse direction, however, a station can preserve network integrity by "wrapping" packets from the primary ring back onto the secondary ring when it detects that the link to its downstream neighbor station has been lost.

FIG. 2, for instance, depicts the configuration that results if a break occurs in the link comprising cables 22 and 30. Dashed lines 46 represent the new loop, in which stations 16 and 18 have detected the break and have "wrapped" the loop back upon itself so that station 12, for instance, is interposed in the same loop at two points, rather than at one point in each of two loops. With this arrangement, each station can still communicate with all of the others.

A similarly graceful adjustment occurs if power is lost at one station, as FIG. 3 shows. In that drawing, dashed lines 48 depict the new loop, in which stations 14 and 18 do the "wrapping," while station 12 forwards data in both directions. In this situation, all of the powered stations can still communicate with each other.

In order to arrive at the appropriate configuration, of course, the stations must engage in some type of initialization in which they assess their abilities to communicate with their respective immediate neighbors. The manner in which this initialization proceeds is known to those skilled in the art and is detailed in the FDDI PHY specification. Briefly, however, it involves elements depicted in FIG. 4.

A MAC (Media-Access Control) module 50 in FIG. 4 implements functions of the media-access sublayer of the International Standards Organization (ISO)/Open System Interconnection (OSI) reference model's data-link layer. Specifically, it recognizes tokens and monitors the source and destination fields in packets received or forwarded over the primary ring so that it can determine when to originate, copy, and remove packets. The MAC module 50 transmits data by applying (typically four-bit-wide or eight-bit-wide) MAC signals to the MAC-level input port 52 of a PHY module 54, which implements the ISO/OSI physical layer's physical sublayer.

A "4b/5b" encoder 56 encodes the incoming MAC signal four bits at a time into corresponding symbols of five serial bits in accordance with a code that ensures that a transition occurs in the resulting serial signal at least once every three bit times. This encoding occurs at a clock rate set by a local clock 58, and the PHY module 54 provides the resultant PHY output signal at a PHY-level output port 60. A PMD module 62, which implements the ISO/OSI physical layer's PMD (Physical-Medium-Dependent) sublayer, receives the PHY signal at its PHY-level input port 64. An optical transmitter 66—i.e., an electrical-to-optical converter—converts that electrical PHY signal into an optical PMD signal and transmits that signal over fiber-optic cable 20 from (PMD-level) output port 38.

The PMD module 62 also includes input port 42, at which light signals received from the secondary ring over fiber-optic cable 28 are applied to an optical receiver 72. Receiver 72 is an optical-to-electrical converter, which converts the optical PMD signals into electrical PHY signals and transmits the resultant PHY signals from the PMD module's PHY-level output port 74 to the PHY-level input port 76 of the PHY module 54.

The PHY signals received at PHY-level input port 76 have been transmitted from a different station and timed by a different reference clock, which is extremely close in frequency to that of the local clock 58 but nonetheless independent of it. In order to extract data from the received PHY signal, therefore, a clock signal implicit in the PHY signal must be recovered. This is part of the function of the clock-and-data-recovery circuit 78.

The clock-and-data-recovery module 78 typically includes a variable oscillator whose output determines when the incoming signal will be sampled to recover its data. The oscillator phase and frequency are controlled by a phase-locked loop, which in essence compares the transition times of the oscillator output with those of the incoming PHY signal and adjusts its frequency to maintain a predetermined relationship between them. This is the main reason for the 4b/5b code that the PHY module employs: without such a code, which insures that the PHY signal never goes for more than a maximum time without producing a transition, the phase-locked loop could lose synchronization with the incoming signal, and the clock-and-data-recovery unit 78 would then sample the PHY signal at the wrong times and thereby extract the data incorrectly.

The clock-and-data-recovery circuit 78 applies the data thus recovered, together with the oscillator output of the phase-locked loop, i.e., the recovered clock, to a framer and elasticity buffer 80. The local, free-running clock 58 clocks all operations downstream of circuit 80, and circuit 80 provides buffering and adds or removes spacer symbols to accommodate the difference between the local clock rate and the recovered clock rate. It also divides the received data-bit stream into five-bit frames, which it applies to a decoder 82.

Decoder 82 reverses the operation performed by encoder 56 and presents the results at the PHY module's MAC-level output port 83. In the illustrated, normal mode, port 83 forwards the results to the MAC-level input port of a similar PHY module 84 for forwarding along the secondary ring. In one of the wrap modules, the MAC module 50 receives the resultant MAC signal and forwards or otherwise processes it in accordance with normal ring operation. Of course, a higher-level entity not shown in the drawing will typically apply data to the MAC module 50 for inclusion in packets that the MAC module 50 originates and/or receive the data contents of packets that the MAC module copies.

The foregoing discussion illustrates that station 12 uses PHY and PMD modules 54 and 62 collectively to communicate with the rings at primary output and secondary input ports 38 and 42 of FIG. 1. It uses similar PHY and PMD modules 84 and 85 to communicate at ports 36 and 44. In the normal, forwarding configuration described above, the MAC module 50 forwards MAC signals from PHY module 84 to the MAC-level input port 52 of PHY module 54, ultimately for transmission over fiber-optic cable 20 to the next station in the ring. Before this configuration is adopted, however, an initialization process must occur that, among other things, synchronizes clock-and-data-recovery module 78 with the upstream station's local clock and establishes that the PHY and PMD modules 54 and 62 can communicate in both directions with corresponding circuitry at station 18. This is among the tasks of an SMT (Station ManagemenT) module 86.

The SMT module is a control circuit that determines, among other things, whether the station is to forward packets to the next station or "wrap" them back toward the station from which they came. Among the criteria that it uses are some for which it tests in the initialization operation and in subsequent monitoring. In the initialization operation, the SMT module operates switches SW1 through SW4 to states b, a, a, and a, respectively. That is, it decouples the MAC module 50 from the PHY modules 54 and 84 and decouples those modules from each other. It additionally operates a switch SW5 to connect the optical transmitter to a generator 87 of "line state" messages specified in the FDDI protocol.

The protocol specifies a sequence of such messages, and the SMT operates generator 87 to send them from the primary output port 38.

Station 18 uses these signals to synchronize the phase-locked loop in its clock-and-data-recovery module with station 12's local clock 58. It simultaneously transmits signals over the secondary ring back to station 12 of FIG. 4, which the clock-and-data-recovery module 78 employs for synchronization purposes. That is, the SMT module 86 monitors the operation of the clock-and-data-recovery unit 78 by, for instance, observing its phase-locked loop's error signal and thereby determining when it has reached synchronization.

With synchronization thus achieved, each message in the sequence is sent until, by operation of a line-state-detector 88, the SMT module 86 detects reception of the same message at port 42 from its counterclockwise neighbor 18, after which it proceeds to send the next line-state message in the sequence.

The SMT module 86 simultaneously operates the other PHY module 84 to conduct a similar colloquy with its clockwise neighbor 14, and, when both PHY modules have completed all messages in the prescribed line-state sequence, the SMT operates switches SW1 through SW5 to the states depicted in FIG. 4, in which the MAC module 50 monitors signals received at port 36 from the primary ring, and station 12 forwards signals on both rings in their respective directions except for the packets that the MAC module 50 removes from the primary ring. When the switches are thrown, the "scrub" function must be performed to remove any data packets on the ring which might have been corrupted by the changing switches. This is done by one of several methods outlined in the FDDI SMT specification.

If, as is typical, the initialization colloquy with one neighbor is completed before that with the other, the switches assume the appropriate wrap configuration until the other initialization is completed. If initialization with the counterclockwise neighbor 18 finishes first, for instance, switches SW1 through SW5 assume states a, b, a, a, and b, respectively, to enable the MAC module 50 to monitor signals that have been received at the secondary-ring input port 42 and will be forwarded, if the MAC module 50 does not remove them, from the primary-ring output port 38.

Of course, defects can arise not only before initialization but also afterward, while the ring is in steady-state operation. During such operations, therefore, the SMT module monitors the PMDs for the QLS line state (loss of carrier), the clock-and-data-recovery module for loss of phase lock, and the decoder 82 for improper code sequences. When errors meeting predetermined criteria occur, the SMD operates switches SW1 through SW4 to reconfigure the station accordingly, and it transmits the QLS line state, which causes ring operation to be reinitialized.

The dual-ring organization is not the only topology of which the FDDI standard admits. Stations of the type depicted in FIGS. 1, 2, and 3 are referred to as "dual-attachment" stations. A dual-attachment station provides two interfaces, one for each of its two neighbors. This arrangement is necessary if, as is often the case, the stations are remote enough from each other that it is not practical for a common circuit to monitor their operations and form data pathways around defective links or stations that are not operating properly. On the other hand, if a number of stations can indeed be connected to such a common circuit, they can be implemented as "single-attachment" stations, each of which provides only a single interface to this common circuit.

FIG. 5 depicts such a topology. In FIG. 5, each of a plurality of stations 92, 94, 96, and 98 communicates with each of its neighbors by only a single, single-direction line.

For ongoing operation, this is adequate to provide the required functions: the packets travel the ring, being forwarded by each station to its downstream neighbor, which generates, copies, or removes packets in the manner described above. To provide the necessary reliability, however, a concentrator 100 is interposed in all of the links so as to monitor them and determine whether they are functioning properly. If so, the ring is that formed by the fiber-optic cables 102 connected as indicated by the dashed connection lines 104 in FIG. 5. The concentrator 100 includes provisions for rerouting ring signals around a defective link or station, however, and it thereby provides the reliability that the networks of FIGS. 1, 2, and 3 provide by way of the dual ring.

In some networks, only subsets of the stations on a given network may lend themselves to interconnection by concentrators, so the concentrators themselves may act as dual-attachment stations on a dual ring. FIG. 6 depicts such a concentrator 110. Concentrator 110 in FIG. 6 includes PMD modules 112 and 114 as well as PHY modules 116 and 118 in the conventional arrangement of a dual-attachment station. That is, signals from a cable 120 on the secondary ring are ordinarily simply forwarded to the next link 122 in the secondary ring, while those received from link 124 on the primary ring are "read" by MAC modules to determine whether they should be copied and whether they should be forwarded over the next link 126 in the primary ring.

This MAC-level activity is performed by MAC modules in the single-attachment stations ("SAS1, SAS2, ...") 128, 130, 132, and 134 connected to concentrator 110. In principle, therefore, concentrator 110 does not itself need to include a MAC module, as it does PHY and PMD modules. In practice, however, it ordinarily will include a MAC module 138; the concentrator 110 will usually include additional circuitry, not shown, for transmitting and receiving status and configuration information necessary for proper network maintenance, and such a higher-level entity would communicate over the network by means of the MAC module 138.

As was stated above, initialization requires full-duplex communication between neighboring stations. Like stations 92, 94, 96, 96, and 98, however, single-attachment stations 128, 130, 132, and 134 are not capable of performing such full-duplex communication with their neighbors; station 130 communicates with station 132 by only a single, one-way channel, and its communication with station 128 is also one-way in nature. By including detail omitted from FIG. 5, FIG. 6 shows circuitry that has heretofore been considered necessary in concentrators such as concentrators 100 and 110 in order to perform the initialization process that the FDDI protocol requires.

Specifically, FIG. 6 shows that concentrator 110 includes not only a PMD module 148, 150, 152, or 154 for each attached single-attachment station but also a PHY module 140, 142, 144, or 146, which is needed for initialization. To determine whether the link formed with station 128, for instance, is operable, an SMT module 156 operates module 140 (by means of connections that FIG. 6 omits for the sake of simplicity) to conduct the required initialization colloquy with station 128 and observe the results. If the link with that station and those with the other stations prove to be operable, the SMT configures concentrator 110 to connect the various PHY modules 140, 142, 144, and 146 as shown. On the other hand, if station 130, for instance, proves to be defective, the SMT will operate a switch matrix 157 to re-route the MAC signals, causing the MAC output of PHY module 140 to be applied to PHY module 144 rather than PHY module 142. Station 128 would thereby replace station 130 as the upstream neighbor of station 132.

A little reflection reveals that judicious use of concentrators can actually increase network reliability over that of a pure dual ring, even though the latter uses only dual-attachment stations. Additionally, a concentrator can reduce individual station cost, since the "FDDI corner" in a single-attachment station can be significantly smaller and less expensive than the corresponding circuitry in a dual-attachment station. Some reduction in cabling cost can also result.

Unfortunately, a significant part of the savings in individual-station cost is illusory when conventional concentrators are used. Although the use of single-attachment stations permits half of the PHY and PMD modules to be eliminated, the effect is simply to "move" those modules to a concentrator.

SUMMARY OF THE INVENTION

We have recognized that the FDDI protocol can be followed in a concentrator that does not include a PHY module for every attached station and that therefore can be made considerably smaller and less expensive.

Like conventional FDDI concentrators, our FDDI concentrator includes a PMD module for each station to be attached. Instead of also having a PHY module for each attached station and employing a switch matrix to re-route the MAC signals among these PHY modules, however, we employ only a common pair of PHY modules, which we call initialization and concentrator PHY modules, and we employ a switch matrix that re-routes PHY signals among the PMD modules.

To perform the initialization process, the concentrator's control circuit so operates the switch matrix as to connect only a first one of the PMD modules to the initialization PHY module. If that PMD module is coupled to an attached station, therefore, the initialization PHY module is thereby placed into full-duplex communication with the attached station and can thus perform the initialization process with it. During that process, the initialization PHY employs the concentrator's local, free-running clock in the normal manner to transmit data required for the initialization sequence.

When initialization has been reached with the attached station, the switch matrix switches that first PMD module from the initialization PHY module to the concentrator PHY module, i.e., forms a concentrator loop containing the PMD module and the concentrator PHY module, with which the attached station's receive clock is already in synchronization because the concentrator PHY module employs the same, flee-running local clock for transmission as the initialization PHY did.

The switch matrix then connects another single PMD module to the initialization PHY module. This time, however, the initialization PHY module times its transmission with the clock recovered from the first attached station's output. After the initialization PHY module and the station attached to the second PMD module have completed their initialization process, therefore, the second PMD module will be in proper synchronization when, in accordance with the present invention, it is switched into the concentrator loop immediately downstream of the first PMD module.

This process continues until all the desired PMD modules form a loop with the concentrator PHY module. Initialization has thus been performed without the need for dual-attachment stations and without the need for a separate PHY module in the concentrator for each attached station.

BRIEF DESCRIPTION OF THE DRAWINGS

These and further features and advantages of the present invention are described below in connection with the accompanying drawings, in which.

DETAILED DESCRIPTION OF AN ILLUSTRATIVE EMBODIMENT

Figure 1:
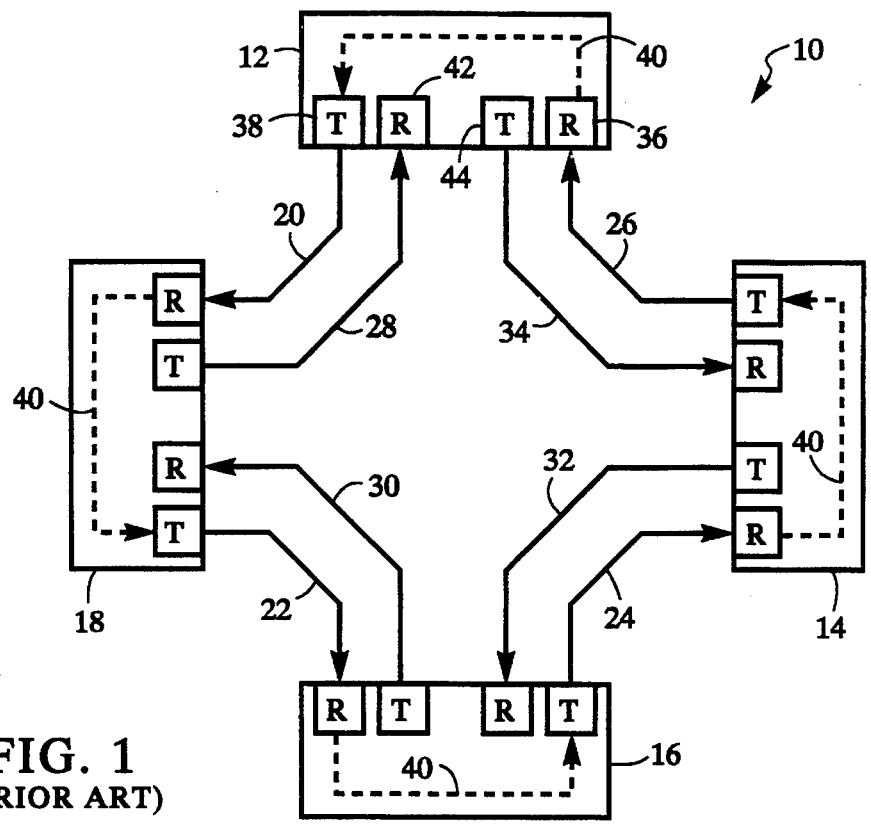
FIG. 1, previously described, is a block diagram of a typical FDDI network.
Figure 2:
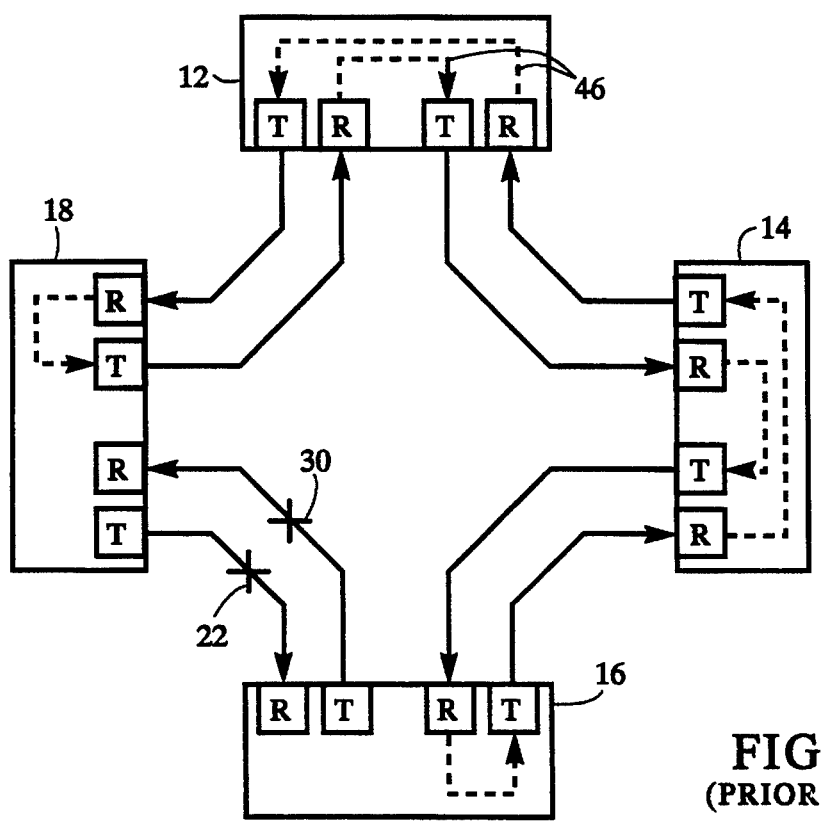
FIG. 2, previously described, is a block diagram of the same network illustrating the results of a break in one of the optical links.
Figure 3:
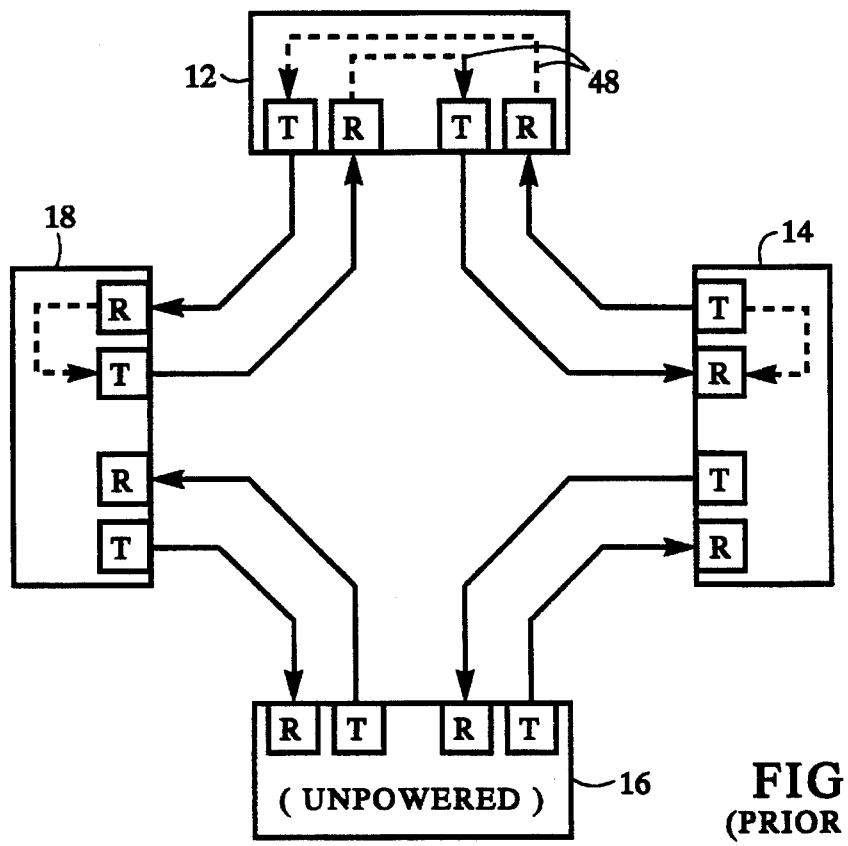
FIG. 3, previously described, is a similar diagram showing the result of a loss of power to one of the stations in the network.
Figure 5:
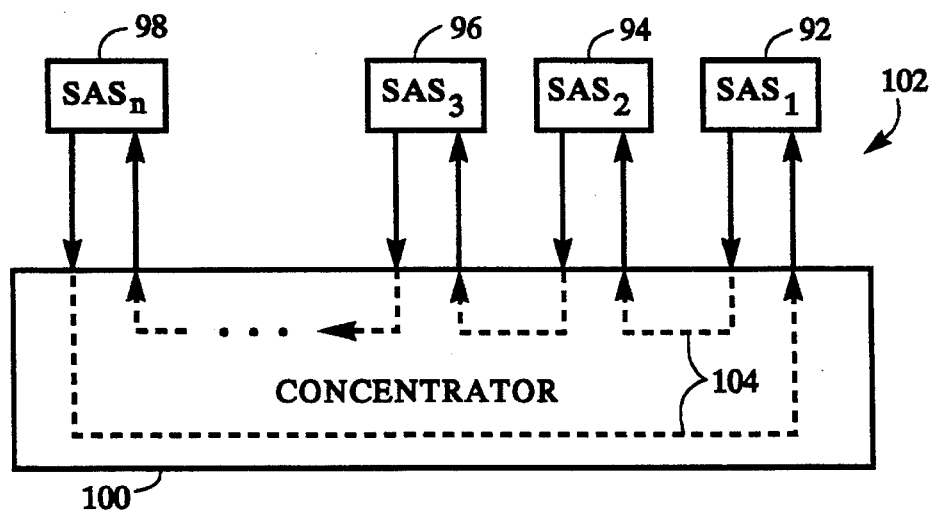
FIG. 5, previously described, is a block diagram depicting a network implemented with a concentrator and single-attachment stations.
Figure 4:
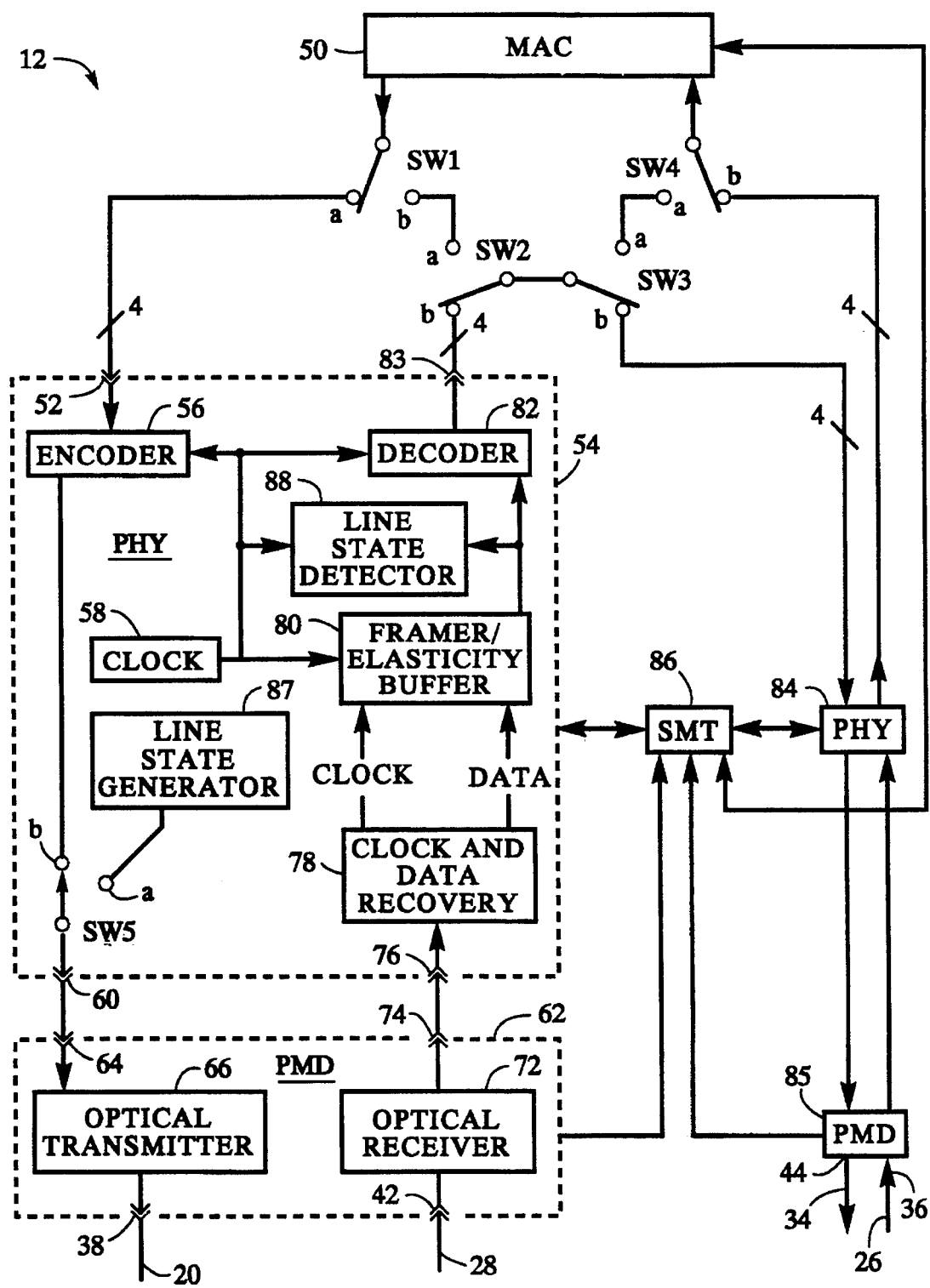
FIG. 4, previously described, is a more-detailed block diagram of the physical-layer circuitry provided at one port in a station on that network.
Figure 6:
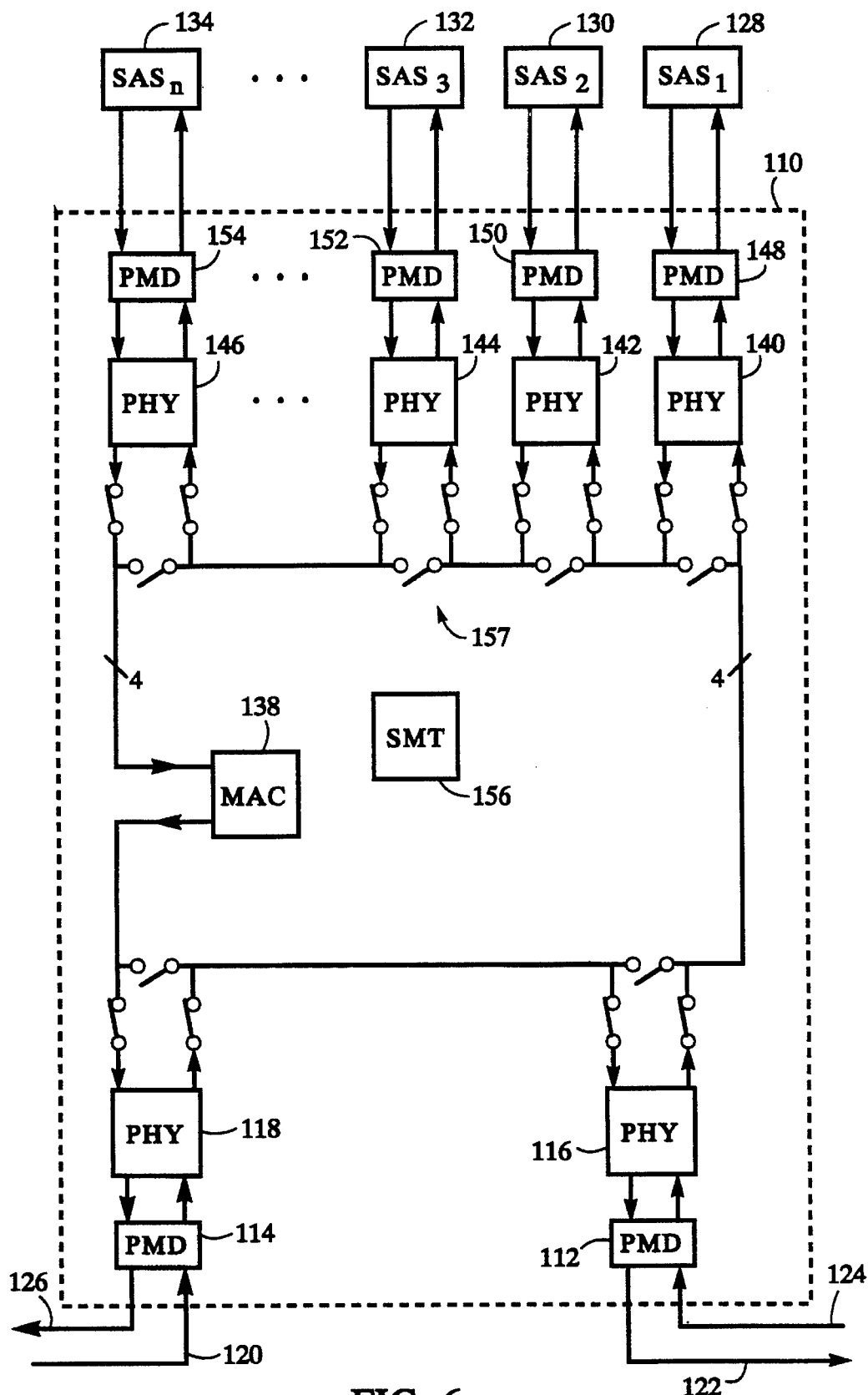
FIG. 6, previously described, is a block diagram of a conventional concentrator of the type employed in the prior art.
Figure 7:
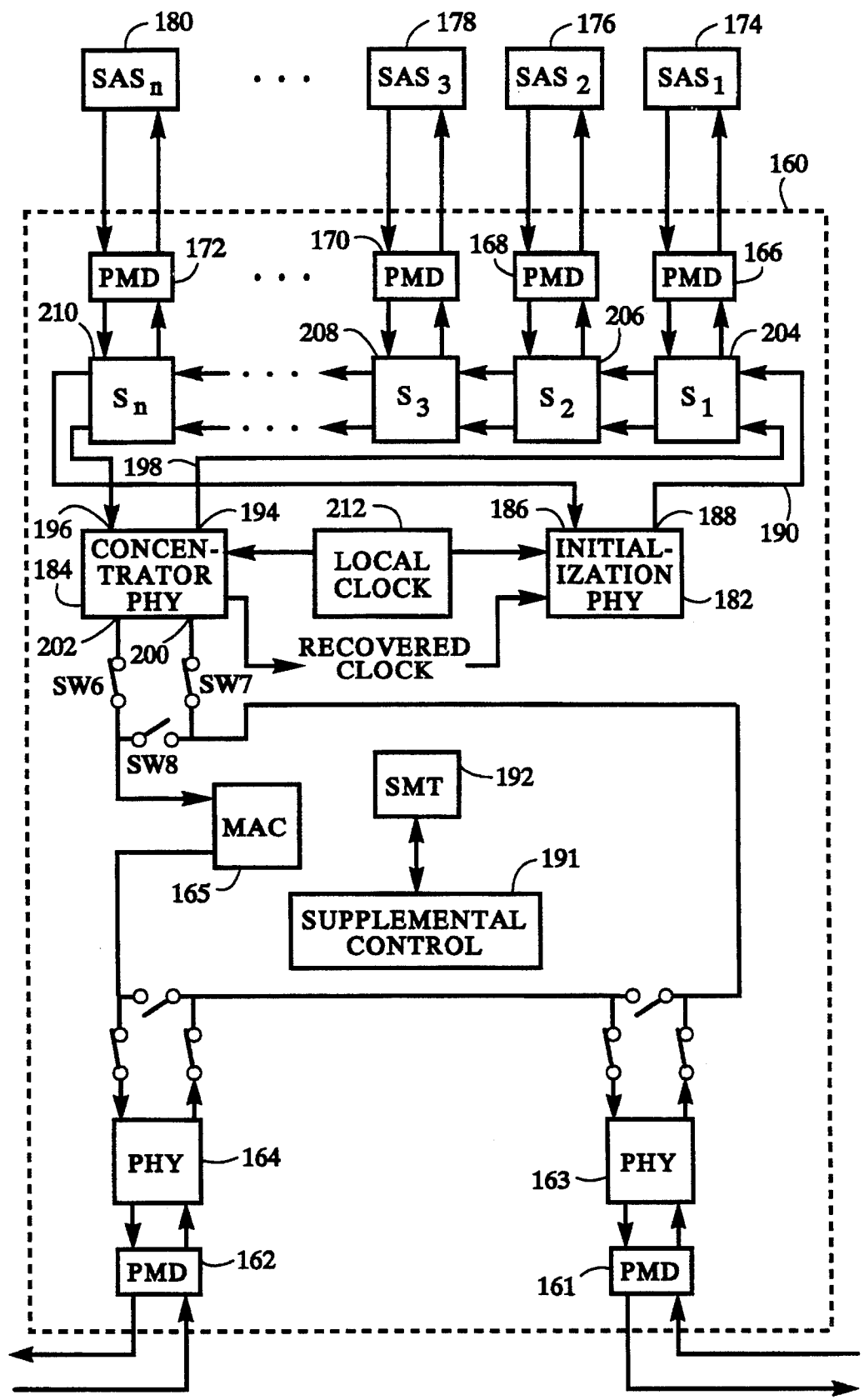
FIG. 7 is a block diagram of a concentrator that employs the teachings of the present invention.

FIG. 7 depicts a concentrator 160 that embodies the present invention. For communication with an external dual ring, not shown, it includes PMD modules 161 and 162 and PHY modules 163 and 164, which perform functions identical to those of the corresponding elements in FIG. 6. A MAC module 165 also performs identically. Like the corresponding elements in FIG. 6, these are typical, but not necessary, elements of a concentrator; as was described in connection with FIG. 5, a concentrator will not necessarily be part of a dual ring. Even if it is part of a dual ring, moreover, it does not in principle need to remove or add packets from the ring, so the MAC module 165 is not always required even if the PHY and PMD modules are.

The concentrator 160 of the present invention does include the usual PMD modules 166, 168, 170, and 172 for coupling to attached stations 174, 176, 178, and 180, respectively. Instead of having one PHY module for each attached station, however, it has only two altogether, namely, an initialization PHY module 182 and a concentrator PHY module 184. The PHY-level input and output ports 186 and 188 of the initialization PHY module 182 are interposed in an initialization ring 190, over which PHY signals propagate. To perform various functions described below, a supplementary control circuit 191 monitors the operation of an SMT module 192 and supplements its operation so that together they act as a control circuit for controlling the other elements.

The concentrator PHY 184 has its PHY-level ports 194 and 196 similarly interposed in a concentrator ring 198. FIG. 7 depicts the concentrator PHY module's MAC-level ports 200 and 202 as communicating with the primary ring of the dual-ring network, as it would in a concentrator that is installed as a station on such a network. This is not necessary to the present invention, however; if concentrator 160 were employed in the topology of FIG. 5, for instance, the concentrator PHY's MAC-level ports 200 and 202 would simply be tied together, or some equivalent internal forwarding would occur.

Figure 8A:
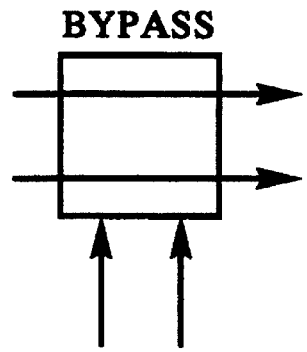
FIGS. 8A, 8B, and 8C depict the bypass, initialization, and concentrator states of the matrix switches employed in the concentrator of FIG. 7.

To initialize the attached stations, the control circuit 191 first operates a matrix of switches 204, 206, 208, and 210 to a configuration in which all except one are in the bypass state depicted in FIG. 8A.

Figure 8B:
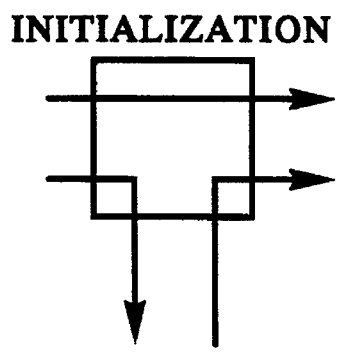

In this state, the switches merely provide continuity to both rings and do not interpose their respective PMD modules into either. However, the control circuit 191 does place switch 204 into an initialization state, which FIG. 8B depicts, in which switch 204 interposes the PHY-level ports of PMD module 166 into the initialization ring 190. This places the initialization PHY 182 into full-duplex communication with station 174, and SMT 192 can accordingly operate the initialization PHY module 182 to perform the initialization operation with that station. The data transmission that the initialization PHY 182 performs is synchronized to a local, free-running clock 212, while initialization PHY module 182's internal phase-locked loop synchronizes data recovery to the corresponding local clock in attached station 174.

Figure 8C:
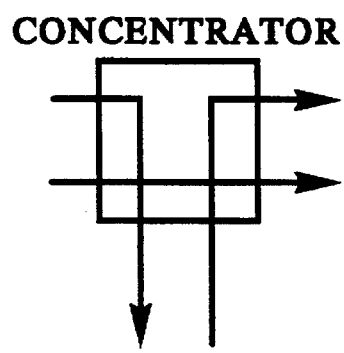

When the synchronization and other initialization functions at this level have been completed for station 174—i.e., when that station is in the FDDI ACTIVE state—the SMT module 212 operates switch 204 to the concentrator state depicted in FIG. 8C, thereby interposing PMD module 166 in the concentrator ring. This places the first attached station 174 into a ring with the concentrator PHY module 184.

The attached station 174's receive clock is already in synchronization with the output of PHY module 184 because that PHY module's transmit clock is local clock 212, the same clock that initialization PHY module 182 was employing. It therefore does not lose its ACTIVE state. Concentrator PHY 184's receive clock (i.e., its phase-locked-loop oscillator) is not initially synchronized, but this has no effect on the ready state of attached station 174.

It also does not affect the rest of the network; control module 191 causes the concentrator PHY module to perform a so-called scrub sequence, which replaces with IDLE messages any data that it might otherwise have sent erroneously in response to the incoming signal with which it is not at first synchronized. The scrub sequence will cause MAC modules to reinitialize but will not affect the operation or states of the PHY modules. Once the scrub sequence is complete, the MAC modules resume their normal operation sequence.

Of course, synchronization does occur in short order, and transmission and reception accordingly proceed in the normal manner over the concentrator ring. In some embodiments of the illustrated type, therefore, in which the concentrator is interposed in an external ring, station 174 thereby joins the external ring.

The control circuit 191 next operates switch 206 from the bypass state to the initialization state, thereby placing the second attached station 176 into full-duplex communication with the initialization PHY module 182. The SMT module 192 then causes the initialization PHY module 182 to undertake the initialization procedure with the second attached station 176 as it did with the first, with the exception that initialization PHY module 182 now uses as its transmit clock signal the clock signal that the concentrator PHY module 184 has recovered from its PHY-signal input. The initialization PHY module 182 receives this recovered clock signal over line 214 from the concentrator PHY module 196.

When the initialization exchange has been completed with attached station 176, SMT module 192 operates switch 206 to the concentrator state so as to place that station in the concentrator ring immediately downstream of station 174. Since the initialization PHY module 182 essentially used station 174's transmit clock as its own during station 176's initialization, station 176 remains synchronized and is unaware of the switch changes. As before, of course, the receive clock of the concentrator PHY module 184 falls out of synchronization initially, but, as before, the forced scrub sequence insures that the momentary synchronization loss does not introduce errors into ring operation.

This process continues, with each new station being interposed into the concentrator ring downstream of the previous station, until all attached stations—or as many as are available and intended to be included in the network—have been initialized and placed into the concentrator ring. The initialization process at this level is then complete, and network operation can proceed.

As was stated above, the concentrator PHY module transmits a scrub sequence each time a new single-attachment station is connected into the concentrator ring, and this causes MAC-level re-initialization at each station. In some embodiments of the invention, it may be desired to minimize the amount of such MAC-module re-initialization. For that reason, the embodiment illustrated in FIG. 7 includes switches SW6, SW7, and SW8, which, in the states opposite those illustrated, isolate the concentrator PHY module 184—and thus stations 174, 176, 178, and 180—from the greater loop in which concentrator 160 is interposed. The control module 191 controls these switches so that they thus isolate the concentrator PHY module 184 until initialization with the single-attachment stations has been completed. It then reverses those switches' states, and thereby connects the concentrator loop into the greater loop, so the concentrator causes greater-loop re-initialization only once.

Of course, the initialization process is not always successful with every one of the single-attachment stations; a link can be broken, or a station can be defective or unpowered. In such an instance, the SMT module 192 simply returns the switch associated with the defective link to the bypass state and proceeds to attempt initialization of the next station.

If a station fails after the initialization operation has been completed and normal network operation has begun, the stations will operate in the manner conventional for such situations. That is, the nearest downstream neighbor will detect the loss of valid signals and begin to send what is known in the FDDI standard as the QUIET sequence. This propagates to all stations on the ring, which thereby stop transmitting and begin to re-initialize. This enables concentrator 160 to start from the beginning and perform the initialization sequence again so as to reconfigure without the defective station.

The control and SMT modules can be arranged to keep operating the initialization PHY 182 even after a network initialization has been completed. The purpose would be to attempt initialization sequentially with the various PMDs that had not previously completed the initialization process successfully. If a previously dormant attached station powers up, therefore, the control circuit 191 will be alerted to that occurrence, and it may be programmed to insert the newly active station in response. This would involve temporarily removing all downstream attached stations and then reinitializing them. Otherwise, insertion of a new station would result in loss of synchronization.

This result, namely, the need to remove all downstream attached stations temporarily and then reinitialize them, is a result only of the particular switch matrix employed in the illustrated embodiment, not an inescapable feature of the invention itself. Perusal of FIG. 7 reveals that the particular switch-matrix arrangement represented by switches 204, 206, 208, and 210 imposes a predetermined routing sequence among the PMD modules 166, 168, 170, and 172: if modules 166 and 170, for instance, are both included in the concentrator loop, the specific switch-matrix arrangement of FIG. 7 requires that PMD module 170 be disposed downstream of PMD module 166, either immediately downstream of it or downstream of it with module 168 interposed. As a consequence, if a PMD module 166 requires insertion into the concentrator loop after module 170 has already been incorporated, removal and reinitialization of PMD module 170 and its attached station are necessary.

Clearly, a denser switch matrix, which so interconnects the concentrator PHY module and all of the PMD modules so as to enable the PHY-level output port of each to be connected to the PHY-level input port of any of the others, could form the concentrator loop in any order, and any such matrix that additionally multiplexed the PMD PHY-level port pairs to the initialization-PHY port pair could provide the necessary connections to the initialization PHY. Despite the additional flexibility afforded by such arrangements, however, we prefer that illustrated in FIGS. 7 and 8 because the hardware needed to realize it is not as complex as the hardware required for denser switch matrices.

Not only does the illustrated concentrator require fewer PHY modules than conventional concentrators do, but its switch matrix, which switches serial PHY signals, can be less elaborate than those of conventional concentrators, which must switch typically parallel MAC signals. A concentrator that embodies the present invention can therefore implement the FDDI protocol, including its initialization functions, with significantly less size, power use, and cost than conventional FDDI concentrators require. The present invention thus constitutes a significant advance in the art.

We claim:

1. A network concentrator implementing physical layer PHY signals, and implementing physical medium dependent PMD signals, comprising:

a plurality of PMD modules, each PMD module of said plurality of PMD modules producing PHY signals;

an initialization PHY module to exchange initialization PHY signals with said plurality of PMD modules;

a concentrator PHY module to exchange packet PHY signals with said plurality of PMD modules; and switch means to connect said each PMD module of said plurality of PMD modules to said PHY initialization module during an initialization operation of said concentrator, and to connect said each PMD module to said concentrator PHY module during packet forwarding operation of said concentrator.

2. The apparatus as in claim 1, further comprising:

means for deriving a recovered clock signal by said concentrator PHY module, said recovered clock signal derived from traffic on a network connected to said concentrator PHY module; and means for synchronizing said initialization PHY module by said recovered clock signal.

3. The apparatus of claim 1, further comprising:

means for sequentially connecting said each PMD module to said concentrator PHY module, and synchronizing said each PMD module with a clock located in said initialization PHY module.

4. A network concentrator implementing physical layer PHY signals, and implementing physical medium dependent PMD signals, comprising:

means for exchanging initialization PHY signals with said plurality of PMD modules by an initialization PHY module;

means for exchanging packet PHY signals with said plurality of PMD modules by a connector PHY module;

means for deriving a recovered clock signal by said concentrator PHY module, said recovered clock signal derived from traffic on a network connected to said concentrator PHY module;

means for sequentially connecting each PMD module of said plurality of PMD modules to said initialization PHY module, and synchronizing said each PMD module with said recovered clock signal; and means for connecting said each PMD modules to said concentrator during packet forwarding operation of said concentrator to forward packets between said plurality of PMD modules and said network connected to said concentrator PHY module.

5. The apparatus as in claim 4, wherein said means for sequentially connecting said each PMD module to said initialization PHY module, further comprises:

a plurality of PMD switches, each individual PMD switch of said plurality of PMD switches connected to an associated PMD module of said plurality of PMD modules.

6. The apparatus as in claim 4 wherein said means for connecting said each PMD module to said concentrator PHY module, further comprises:

a plurality of PMD switches, each individual PMD switch of said plurality of PMD switches connected to an associated PMD module of said each PMD module.

7. A method of operating a network concentrator implementing physical layer PHY signals, and implementing physical medium dependent PMD signals, comprising the steps of:

producing PHY signals by a plurality of PMD modules;

exchanging initialization PHY signals with said plurality of PMD modules by an initialization PHY module;

exchanging packet PHY signals with said plurality of PMD modules by a concentrator PHY module;

connecting each PMD module of said plurality of PMD modules to said PHY initialization module during an initialization operation of said concentrator; and connecting said each PMD module to said concentrator PHY module during packet forwarding operation of said concentrator.

8. The method of claim 7 further comprising:

deriving a recovered clock signal by said concentrator PHY module, said recovered clock signal derived from traffic on a network connected to said concentrator PHY module;

synchronizing said initialization PHY module by said recovered clock signal.

9. The method of claim 7 further comprising:

sequentially connecting said each PMD module to said concentrator PHY module, and synchronizing said each PMD module with a clock located in said initialization PHY module.

10. A method of operating a network concentrator implementing physical layer PHY signals, and implementing physical medium dependent PMD signals, comprising the steps of:

producing PHY signals by a plurality of PMD modules;

exchanging initialization PHY signals with said plurality of PMD modules by an initialization PHY module;

exchanging packet PHY signals with said plurality of PMD modules by a concentrator PHY module;

deriving a recovered clock signal by said concentrator PHY module, said recovered clock signal derived from traffic on a network connected to said concentrator PHY module;

sequentially connecting each PMD module of said plurality of PMD modules to aid concentrator PHY module, and synchronizing said each PMD module with said recovered clock signal; and connecting said each PMD module to said concentrator PHY module during packet forwarding operation of said concentrator to forward packets between said plurality of PMD modules and said network connected to aid concentrator PHY module.

11. The method as in claim 10, further comprising:

connecting an associated said PMD module to said initialization PHY module by a plurality of PMD switches, each individual PMD switch of said plurality of PMD switches connected to said associated said PMD module.

12. The method as in claim 10, further comprising:

connecting said each PMD module to said concentrator PHY module by a plurality of PMD switches.

* * * * *